(12) United States Patent
Benke et al.

(10) Patent No.: US 9,270,092 B2
(45) Date of Patent: Feb. 23, 2016

(54) ROLL ON THE FLOOR CIRCUIT BREAKERS AND RELATED KITS AND METHODS

(71) Applicant: Eaton Corporation, Cleveland, OH (US)

(72) Inventors: James Jeffery Benke, Pittsburgh, PA (US); Daniel Evan Palmieri, Corapolis, PA (US); Douglas Michael Brandt, Wampum, PA (US)

(73) Assignee: Eaton Corporation, Cleveland, OH (US)

( * ) Notice: Subject to any disclaimer, the term of this patent is extended or adjusted under 35 U.S.C. 154(b) by 224 days.

(21) Appl. No.: 14/055,179

(22) Filed: Oct. 16, 2013

(65) Prior Publication Data

US 2015/0101913 A1    Apr. 16, 2015

(51) Int. Cl.
*H02B 11/133* (2006.01)
*B62B 3/00* (2006.01)
*H02B 11/167* (2006.01)

(52) U.S. Cl.
CPC .............. *H02B 11/133* (2013.01); *B62B 3/008* (2013.01); *H02B 11/167* (2013.01); *Y10T 29/49* (2015.01)

(58) Field of Classification Search
CPC .... B62B 3/008; H02B 11/133; H02B 11/167; Y10T 29/49
USPC ........................ 200/50.21–50.27, 308; 29/592
See application file for complete search history.

(56) References Cited

U.S. PATENT DOCUMENTS

| 4,480,932 | A | * | 11/1984 | Willcox | .................... B41J 25/24 200/308 |
| 6,066,814 | A |  | 5/2000  | Smith et al. | |
| 7,057,123 | B1| * | 6/2006  | Jenkins | ................ H02B 11/133 200/50.23 |

FOREIGN PATENT DOCUMENTS

| DE | 10054306   | 7/2002  |
| GB | 2118107    | 10/1983 |
| JP | S586016    | 1/1983  |
| JP | 2009095156 | 4/2009  |

OTHER PUBLICATIONS

Eaton Cutler Hammer,VCP-W direct roll-in Medium voltage vacuum breakers and components-5-27 kV, Sep. 2011.*
Eaton Corporation Cutler-Hammer VCP-W Roll on the Floor Medium Voltage Vacuum Breakers and Components, Product Brochure, 2 pages, date unknown but before the filed of the above application and believed to be 2003,.
Concise statement of relevance for JP S586016, extended European Search Report for corresponding EP Application No. 14188315, Mar. 2, 2015, 8 pages.

* cited by examiner

*Primary Examiner* — Edwin A. Leon
(74) *Attorney, Agent, or Firm* — Myers Bigel & Sibley, P.A.

(57) ABSTRACT

Roll on floor (ROF) circuit breakers include a plurality of support wheels configured to contact a support surface as the ROF circuit breaker is moved between locations. The support wheels have a rocker configuration whereby weight of the ROF circuit breaker is transferred between different sets of the wheels during movement to thereby facilitate ease of movement.

20 Claims, 13 Drawing Sheets

Mini Module

VCP-W Breaker Racked in Position

ROLL ON THE FLOOR CIRCUIT BREAKERS AND RELATED KITS AND METHODS

FIELD OF THE INVENTION

The present invention relates to electrical draw out components and is particularly suitable for circuit breakers.

BACKGROUND OF THE INVENTION

Roll on the Floor (ROF) breakers which are associated with so-called "draw out breakers" are known. An example of a prior art ROF breaker is shown in FIG. 1. The ROF breakers can be configured to roll into a cell for engaging with components into an operative position. ROF breakers are available in various sizes typically as small and large units with vacuum breakers, e.g., medium voltage circuit breakers, and components ranging in weight from about 250 pounds to about 1200 pounds. The ROF breakers can be used in a number of utility, commercial, industrial and residential environments including distribution stations, main stations, power plants, shops and offices, commercial buildings, industrial production facilities and the like, as is well known to those of skill in the art.

As shown in FIG. 1, the prior art ROF breaker 10 includes four, one on each corner, small diameter metal wheels 10w which can provide sufficient support for the unit but can make the ROF breaker 10 difficult to push forward on a support surface as well as making it difficult to spin, turn or rotate. These types of products are typically lifted onto elevated rails, then racked into the switchgear. Other known prior designs for ROF breakers include units with four swivel wheels such as wheels that can roll directly into the cell from the floor.

Despite the above, there remains a need for alternate ROF breaker designs that are easier to maneuver and that can withstand the unit weight loads.

SUMMARY OF EMBODIMENTS OF THE INVENTION

Embodiments of the present invention are directed to roll on floor (ROF) circuit breakers. The ROF breakers can include a plurality of support wheels configured to contact a support surface as the ROF circuit breaker is moved between locations. The support wheels have a rocker configuration whereby weight of the ROF circuit breaker is transferred between different sets of the wheels during movement on a flat surface to thereby facilitate ease of movement.

The plurality of support wheels can include, on each side, a first end wheel and a second end wheel, the first and second end wheels positioned adjacent respective opposing ends of the side of the ROF circuit breaker, and a third wheel positioned between the first and second end wheels. The third wheel can have an axis of rotation that is below that of the first and second end wheels or has a larger diameter than the first and second end wheels.

The support wheels can be non-swivel wheels.

The plurality of support wheels can be six support wheels, three on each side of the ROF circuit breaker. The support wheels can be attached to the ROF breaker to have a non-swivel configuration.

The support wheels can reside under metal wheels or rollers and can be about 3 inches in diameter. However, the size of the wheels/rollers can vary to match a target product.

The plurality of support wheels can be six support wheels, three on each side of the ROF circuit breaker including a first end wheel and a second end wheel, the first and second end wheels positioned adjacent respective opposing ends of a respective side of the ROF circuit breaker, and a third wheel positioned between the first and second end wheels. The support wheels can be held in respective mounting brackets. The mounting brackets can each include an upper segment that attach to the ROF circuit breaker and a lower segment with downwardly extending spaced apart walls that hold a respective support wheel therebetween. The walls can include an axle aperture that holds an axle that extends through the wheel held therebetween.

The support wheels can have a common outer diameter size. The mounting bracket holding the third wheel can have the axle apertures in the walls residing a distance below the axle apertures in the walls of the mounting brackets holding the respective end wheels. The distance can be between about 0.01 inches to about 0.10 inches.

The distance can be between about 0.04 inches and about 0.07 inches.

The ROF circuit breaker can be a draw out vacuum circuit breaker.

The distance can be about 0.06 inches. The wheels can be about 3 inches in outer diameter but can other sizes (larger or smaller) depending on a respective product.

The upper segments of the mounting brackets can have a common (standardized) shape. The upper segments include a tall segment and a short segment separated by a downwardly extending slot, with at least one downwardly extending channel in the tall and short segments that receive attachment members that attach to a frame of the circuit breaker.

The wheels can be held in brackets that attach to a frame of the circuit breaker. At least one of the brackets on each side of the ROF circuit breaker can have visual indicia that makes the bracket visually distinguishable as different from the other brackets.

The bracket walls can extend down to end proximate a lower end of a respective wheel.

The support wheels can be configured to allow a low force one hand rotation of the ROF circuit breaker. The ROF circuit breaker can weigh between about 250 pounds and about 1200 pounds.

Other embodiments are directed to a retrofit kit for a roll on floor (ROF) circuit breakers. The kits include a set of support wheels (e.g., such as at least six support wheels, four end wheels and two center wheels, three wheels) for each side of a respective existing ROF circuit breaker; and a set of mounting brackets attached to or configured to attach to (provided separate from) respective support wheels. The support wheels can be configured to reside under metal wheels on an existing ROF circuit breaker and have a larger outer diameter than the metal wheels. The wheels and mounting brackets can be configured to attach to the existing ROF circuit breaker and provide a rocker wheel configuration to transfer weight between different sets of wheels when the ROF circuit breaker moves on a flat surface to thereby facilitate ease of movement.

The support wheels can be non-swivel wheels.

The set of support wheels can be six support wheels, three for each side of the ROF circuit breaker, including a first end support wheel and a second end support wheel, the first and second end support wheels positioned adjacent respective opposing ends of a respective side of the ROF circuit breaker, and a third support wheel positioned between the first and second end support wheels. The third support wheel can extend a distance below the first and second end support wheels. The mounting brackets can each include an upper segment that attaches to the ROF circuit breaker and a lower segment with downwardly extending spaced apart walls that hold a respective support wheel therebetween. The walls can include an axle aperture that holds an axle that extends through the wheel held therebetween.

The support wheels can have a common outer diameter size. The mounting bracket holding the third wheel can have the axle apertures in the walls residing a distance below the axle apertures in the walls of the mounting brackets holding the respective end wheels. The distance can be between about 0.04 inches and about 0.07 inches.

The upper segments of the mounting brackets can have a common shape. The upper segments can include a tall segment and a short segment separated by a downwardly extending slot, with at least one downwardly extending channel in the tall and short segments that receive attachment members that attach to a frame of the circuit breaker.

At least two of the brackets can have visual indicia that makes the brackets visually distinguishable as different from the other brackets.

The walls can extend down to end proximate a lower end of a respective wheel.

Still other embodiments are directed to methods of moving a roll on floor (ROF) circuit breaker from one location to another over a support surface. The methods include pushing the ROF circuit breaker causing the ROF to rock and transfer weight between different sets of at least six floor support wheels intermittently; and rotating the circuit breaker by pushing on one upper corner portion with one hand using a low force of between 1-10 pounds to cause the circuit breaker to rotate in a zero or small radius of curvature while rocking the wheels so that not all the support wheels contact the ground at any one time.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

Figure 1:
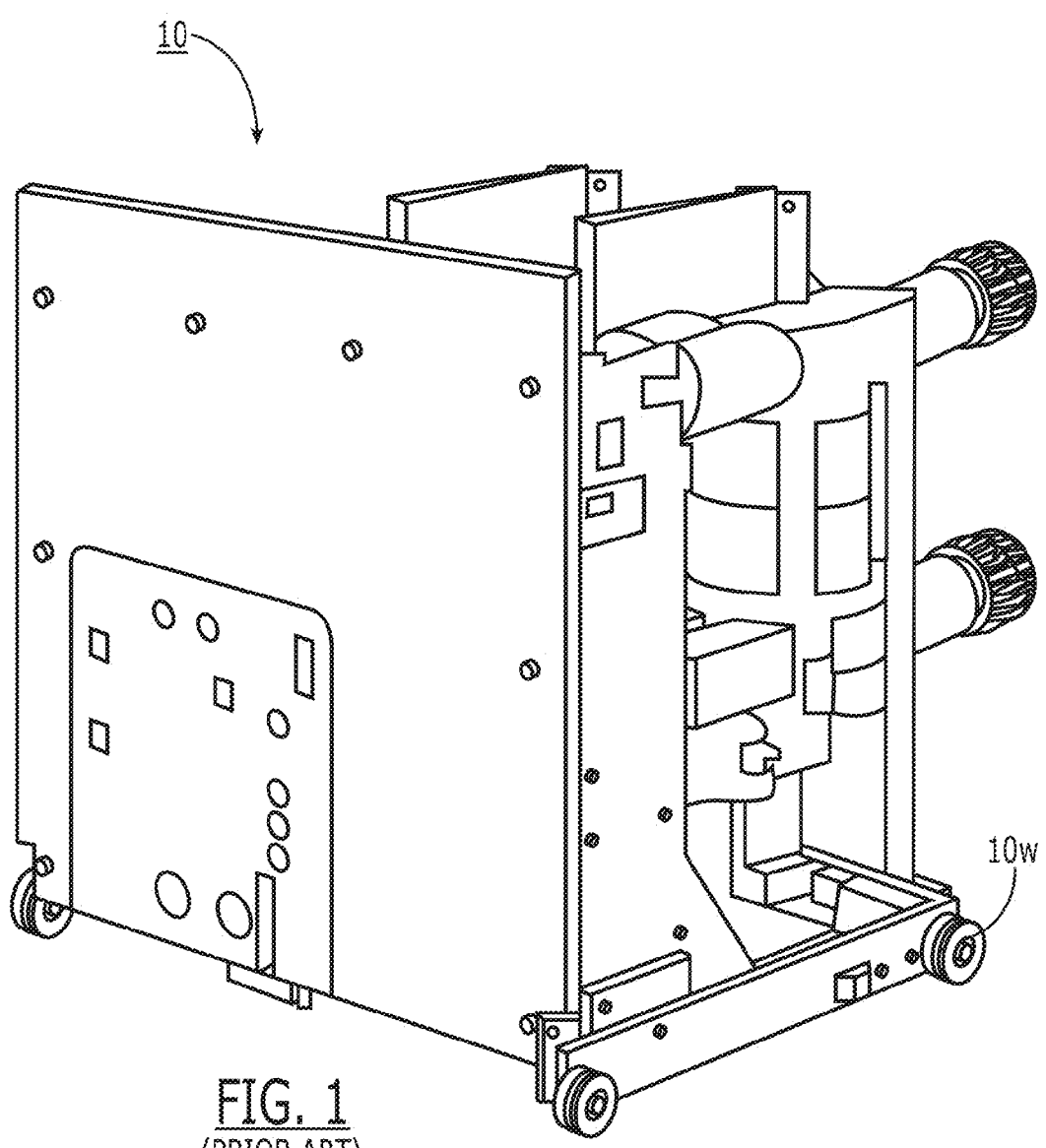
FIG. 1 is a side perspective view of a prior art ROF breaker.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10''').

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Broken lines in the flow charts represent optional features or steps.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

The term "rocker" and derivatives thereof refer to a mechanical design that allows a breaker to naturally move or "rock" back-and-forth and/or side-to-side to transfer weight between different sets or subsets of support wheels as it moves across a floor or other support surface.

The term "flat", when used with respect to a support surface or floor means that the floor or surface is planar, similar to a roadway, and may incline or decline over a distance.

The term "mini module" refers to a subset of a complete switchgear panel.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
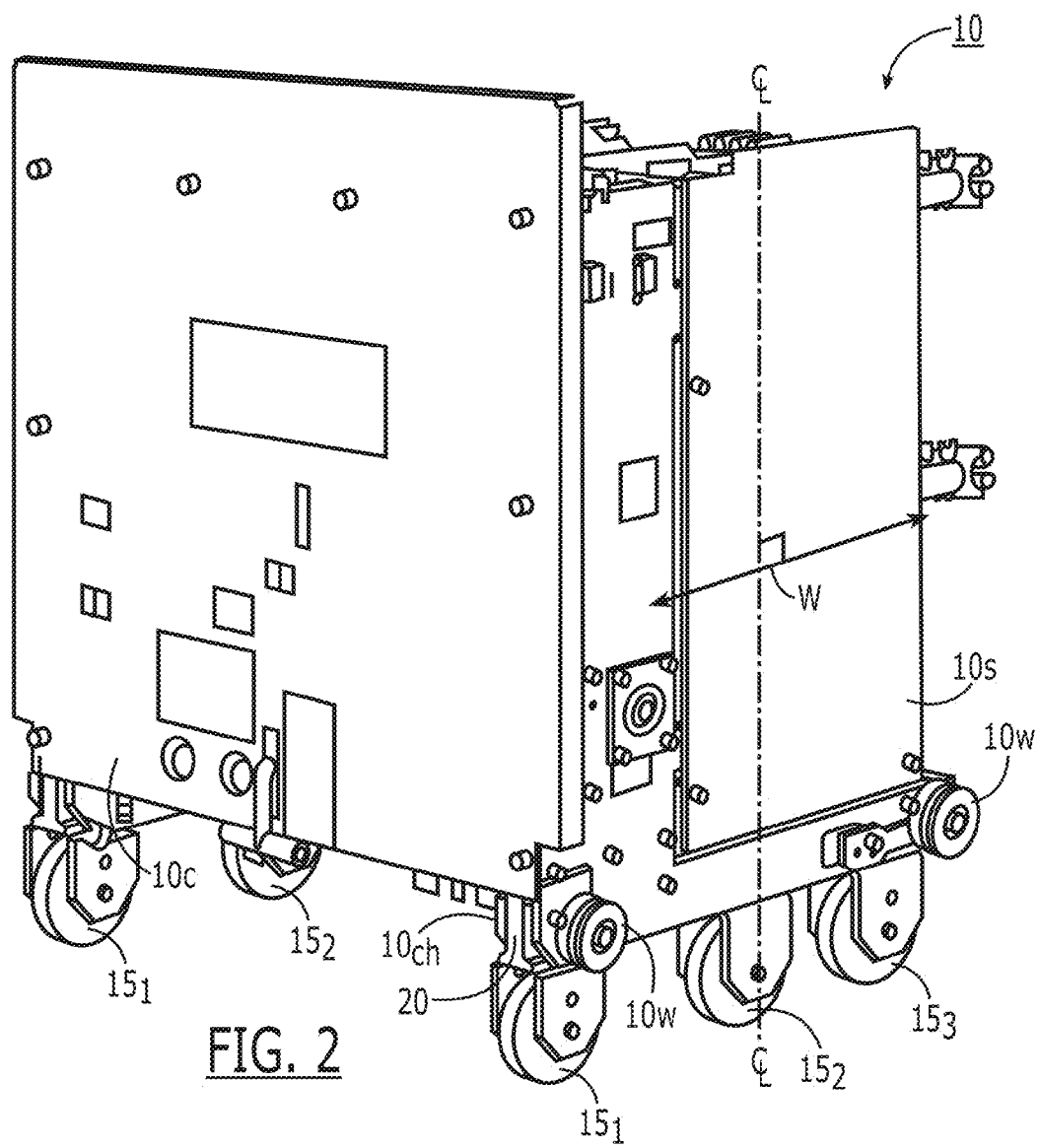
FIG. 2 is a side perspective view of a ROF breaker according to embodiments of the present invention.
Figure 3:
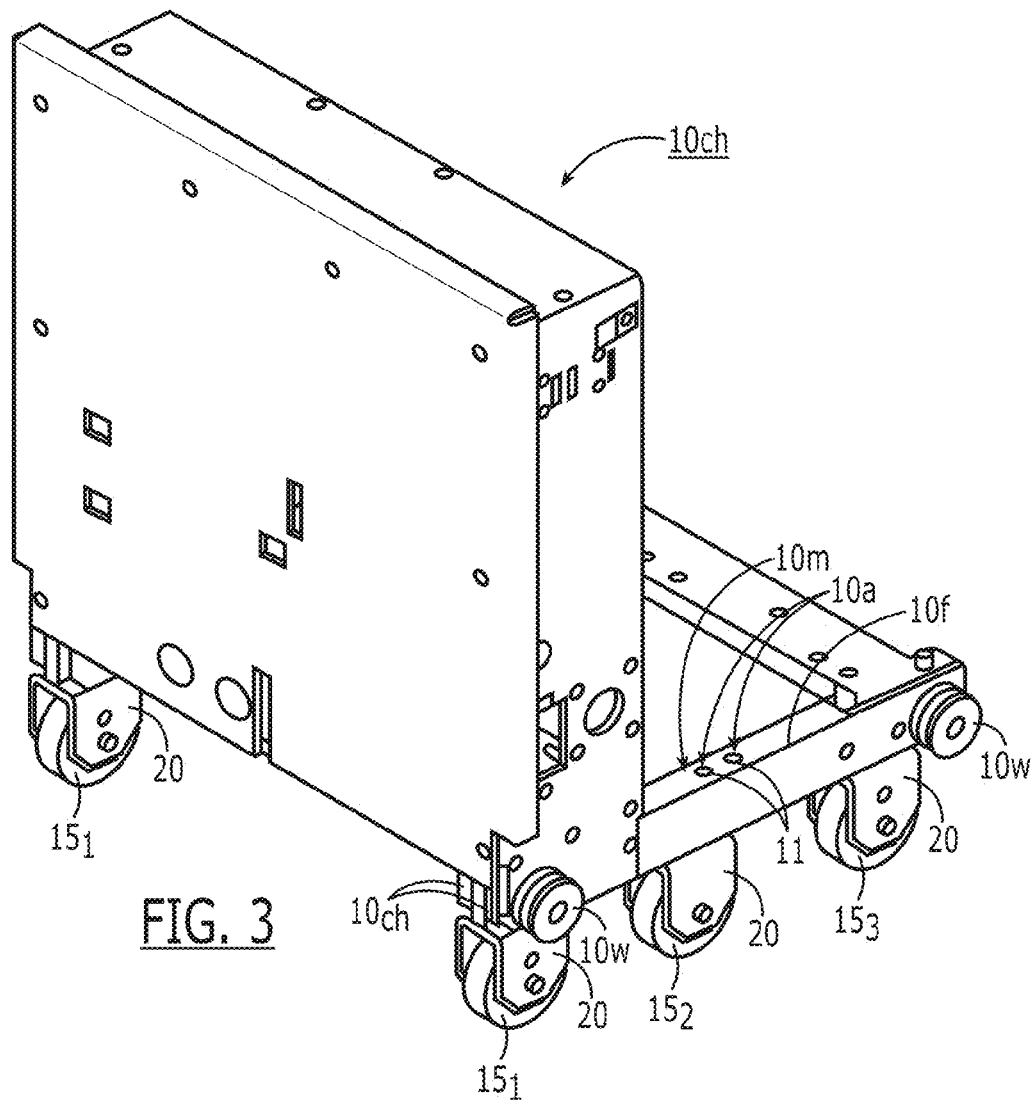
FIG. 3 is a side perspective view of the ROF breaker shown in FIG. 2 without certain components to illustrate an exemplary truck chassis according to embodiments of the present invention.

Referring now to the figures, FIGS. 2 and 3 illustrate a ROF breaker 10 with at least three primary support wheels $15_1$, $15_2$, $15_3$ along each opposing side 10s of the ROF breaker 10 for moving the breaker unit along a support surface such as the floor, a driveway or other terrain or ground. The wheels will be generally referred to with the reference identifier "15".

In preferred embodiments, there are six wheels 15, three on each side 10s of the cover 10c (e.g., along a right hand side and a left hand side). However, additional support wheels 15 may be used, such as, for example, between about 4-7 wheels, if configured to allow for the easy maneuverability provided by the six-wheel design as will be discussed further below. For example, additional secondary support wheels of smaller diameter may provide stabilization on rough terrain but are not required to provide the primary support during movement.

The intermediate wheel $15_2$ on each side resides between corresponding end wheels $15_1$, $15_3$. The intermediate wheel $15_2$ can reside substantially centered between the end wheels $15_1$, $15_2$ or may reside slightly closer to one or the other, typically centered or within about 0-3 inches laterally or longitudinally of a center location defined between. Thus, the intermediate wheel can reside at about 0.25 inches, about 0.5 inches, about 0.75 inches, about 1 inch, about 1.25 inches, about 1.5 inches, about 2 inches, about 2.25 inches, about 2.5 inches, or about 3 inches, laterally or longitudinally of a center location defined between the end wheels. The wheels $15_1$, $15_2$, $15_3$ on each side 10s can be substantially aligned in a straight line with each other or one or more wheel 15 can be offset from another. Similarly, respective wheels $15_1$, $15_2$, $15_3$ on each side can be aligned across the body of the breaker 10 with the counterpart wheels $15_1$, $15_2$, $15_3$.

The wheels 15 can all be the same size and configuration, e.g., the same diameter, width and material. In some embodiments, the wheels 15 can have about a 3-4 inch outer diameter. The surface finish or material may be different on different wheels 15. In some embodiments, the wheels 15 comprise phenolic wheels to reduce friction and allow ease of rotation, e.g., using a single touch or hand to rotate the breaker as shown in FIG. 5B. The phenolic wheels 15 can have about a three inch diameter.

In other embodiments, the wheels comprise other materials including metal. The wheels 15 may optionally be coated to provide suitable low friction surfaces that may be similar to phenolic wheels or better than 1010 steel wheels. Different type or size or different voltage rated ROF breakers may have different wheels. For example, ROF breaker units 10 having weights between about 250-600 pounds can use phenolic wheels. Larger units, e.g., those in the 1000-1200 pound weight range, can employ metal wheels 15. The ROF units can comprise combinations of different roller materials. The ROF breakers 10 can be medium voltage type units, e.g., 5 kV, 15 kV, 38 kV and the like.

The wheels $15_1$, $15_2$, $15_3$ can be mounted to the frame 10f of the chassis 10ch (also called a truck chassis) via mounting brackets 20. The brackets 20 can be attached to the frame 10f using apertures 10a and attachment members 11 (FIG. 4C) such as threaded bolts, pins, rods, clamps, or other suitable attachment members or even adhesives, brazing, welding or other attachment means. In some embodiments, the wheels 15 can be mounted to reside under the smaller metal wheels 10w (FIGS. 2, 3). The brackets 20 can include upper segments 21 that reside in a channel 10ch of the frame 10f and attach to the flat surface 10m.

For retrofit of existing units 10, such as that shown in FIG. 1, a set 25 of six wheels 15 can be provided as a kit 125 or components of a kit 125. FIGS. 2 and 3 illustrate the smaller metal wheels 10w above the retrofit or additional and primary support wheels 15 such that the metal wheels 10w no longer provide the rolling support for the unit 10.

Figure 4A:
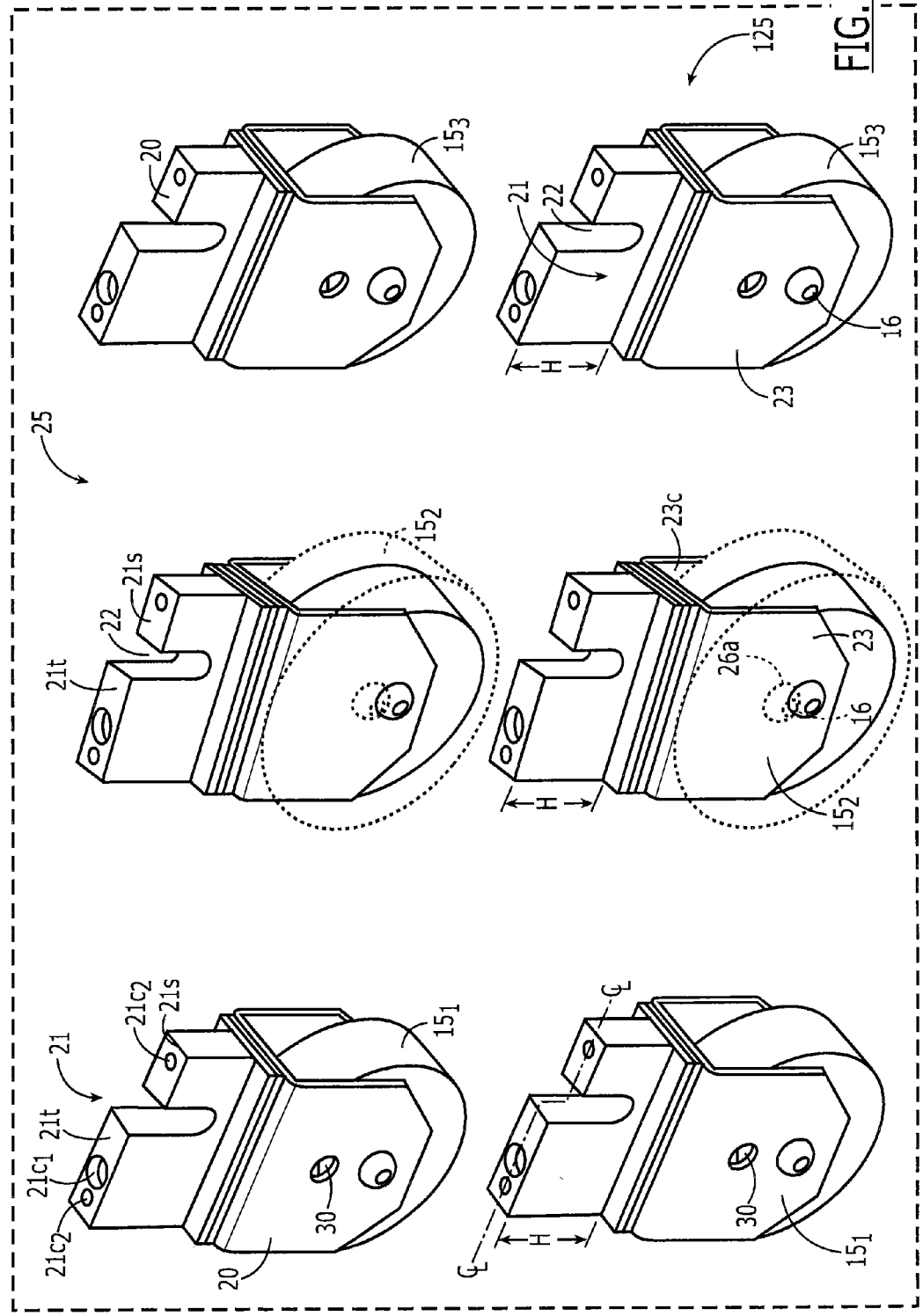
FIG. 4A is a side perspective view of a set of six wheels for an ROF breaker such as the ROF breaker shown in FIGS. 2 and 3, according to embodiments of the present invention.
Figure 4B:
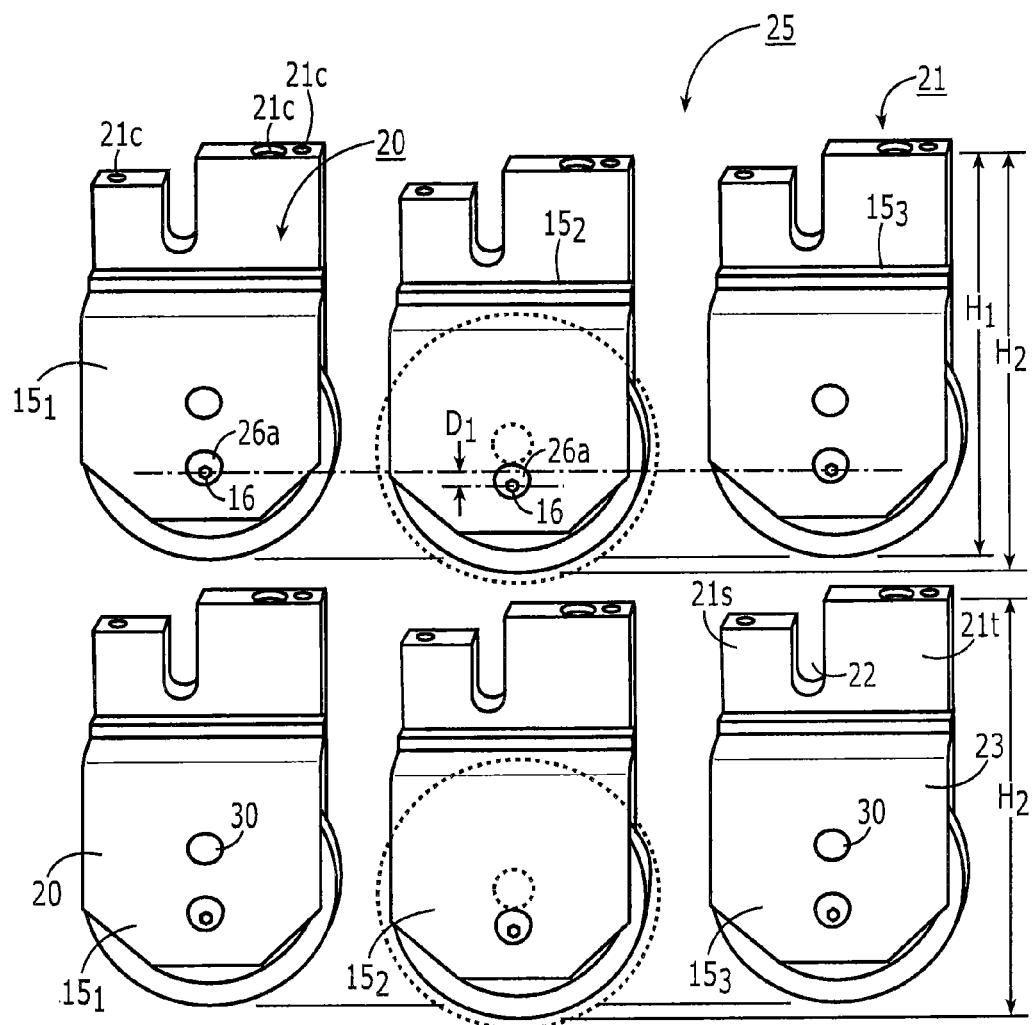
FIG. 4B is a side view of the set of wheels shown in FIG. 4A.
Figure 4C:
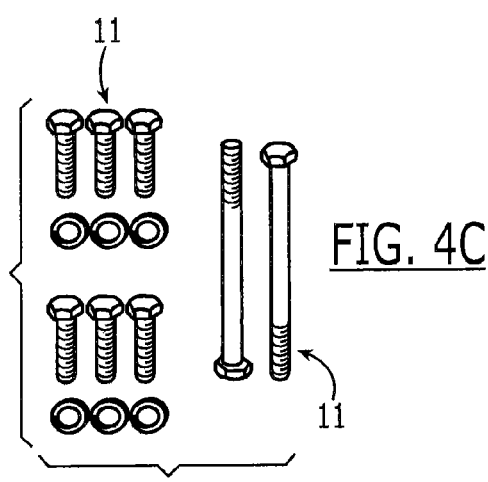
FIG. 4C is a side view of attachment hardware for the set of wheels shown in FIG. 4A.

Referring to FIGS. 4A and 4B, the mounting bracket 20 of the wheels 15 can include an upper segment with a standardized or universal configuration 21 that is common to all the support wheels 15 and provides downwardly extending channels 21c for receiving a respective attachment member 11 (FIG. 4C). The upper segment 21 can include a taller segment 21t and a shorter segment 21s, separated by a downwardly extending slot 22. As shown, the upper segment 21 can be attached to or hold two laterally spaced apart downwardly extending (planar) walls 23 that provide the receiving cavity 23c for a respective wheel 15 and provide the cross-support for the wheel axle 16. The walls 23 can extend down to terminate proximate a lower end of the wheel, e.g., about 0.1 inch to about 0.5 inches above the ground. One of the channels 21c can optionally have a larger cross-sectional area (e.g., diameter) than the other(s).

The slot 22 can provide an anti-rotation or locking feature so that the wheels 15 cannot swivel and travel in a straight line irrespective of whether the breaker 10 is pushed in a straight direction, sideways or rotated. The wheels 15 can be non-swivel wheels such that they only move in a straight line. The wheels 15 can be held inside the walls 23 of the mounting bracket 20 and trapped so that they cannot rotate side-to-side or "swivel."

As shown, there are three channels 21c on each mounting bracket 20, in-line with each other so that the centerlines extend along a common longitudinally drawn center line (C/L) but other numbers and/or configurations may be used.

As shown, a longer and/or larger channel $21c_1$ can reside in the taller of the two segments $21t$ along with an adjacent smaller and/or shorter channel $21c_2$ and a smaller and/or shorter channel $21c_2$ can reside in the shorter segment $21s$.

FIG. 4B illustrates that the center wheel $15_2$ can be configured to have a different operational height $H_2$ than the other two wheels $15_1$, $15_3$ which have a shorter operational height $H_1$. The center wheel $15_2$ can be configured so that it resides a distance between about 0.01-0.10 inches, typically about 0.06 inches, below the lowest end of one or both of the end wheels $15_1$, $15_3$. The wheels 15 can all be the same diameter. The additional operational height ($H_2$-$H_1$) can be provided by an additional length of the mounting bracket 20, e.g., an additional height on the height H of the upper segment 21 (FIG. 4A), a larger diameter wheel $15_2$ (represented by the broken line circle about the center wheel in FIGS. 4A, 4B) or by placement of the axle aperture 26a in the walls of the bracket 23 at a lower position than that of the end wheels $15_1$, $15_2$. Combinations of these different configurations or alternatives may also be used.

Typically, the brackets 20 are the same size and configuration (e.g., all dimensions can be the same) except for the placement of the axle aperture 26a and visual indicia 30 to provide for increased standardization of parts. Thus, as shown in FIG. 4B, the centerline of the axle aperture 26a and the laterally extending corresponding centerline of the end wheels $15_1$, $15_3$ (extending orthogonal to the axis of the axle 16 along the outer wall of the bracket 23 and/or parallel to the side $10s$ of the unit) reside at distance D1 above that of the center wheel $15_2$. This distance D1 is typically between about 0.01 to about 0.10 inches, more typically 0.02 inches, 0.03 inches, 0.04 inches, 0.05 inches, 0.06 inches, or 0.07 inches, and most typically at about 0.06 inches. Thus, the axis of rotation of the center wheel $15_2$ is below the axis of rotation of the end wheels $15_1$, $15_3$.

The height differential between the center wheel $15_2$ and end wheels $15_1$, $15_3$ on each side $10s$ allows the ROF breaker 10 to rock as it travels across a support surface as the wheels 15 can transfer weight among themselves so that not all wheels are providing contact to the support floor at any one time. Typically, the rocker wheel arrangement is configured so that only three wheels 15 provide points of contact with the underlying floor or support surface at any one time. This allows for the ROF breaker 10 to physically rock back and forth due to the rocker design of the wheels (e.g., side-to-side and/or front-to-back) which transfers the weight of the unit from one set (or subset) of wheels to another set (or subset) intermittently as the unit 10 moves. This allows the breaker 10 to move easily between locations and allows the unit 10 to be able to rotate with a small radius of clearance or curvature in one small area with only a slight force, e.g., between about 1-10 lbs at substantially or totally a zero turning radius. For example, as the unit 10 moves forward, weight may be balanced on the two center wheels and one end wheel $15_3$ or $15_1$. When rotated, weight may be balanced on one center wheel and two end wheels, for example. Thus, not all wheels 15 maintain contact during movement and the intermittent weight transfer between different sets of the wheels 15 can allow for ease of movement with less force required over conventional swivel or four wheel designs. The turning radius can be a small turning radius or radius of curvature (e.g., between about 0-3 inches) so that the product turns on itself.

Figure 5A:
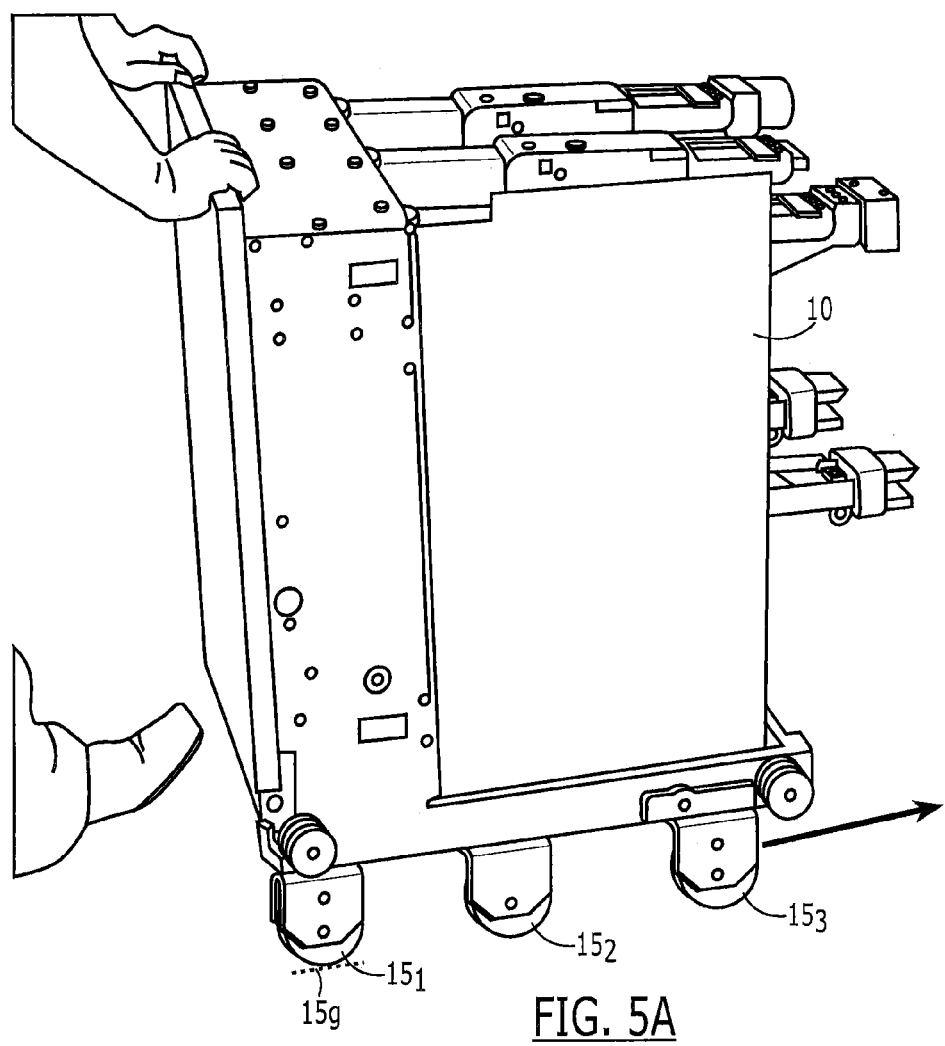
FIGS. 5A-5D illustrate side perspective views of an ROF breaker showing ease of maneuverability according to embodiments of the present invention.
Figure 5B:
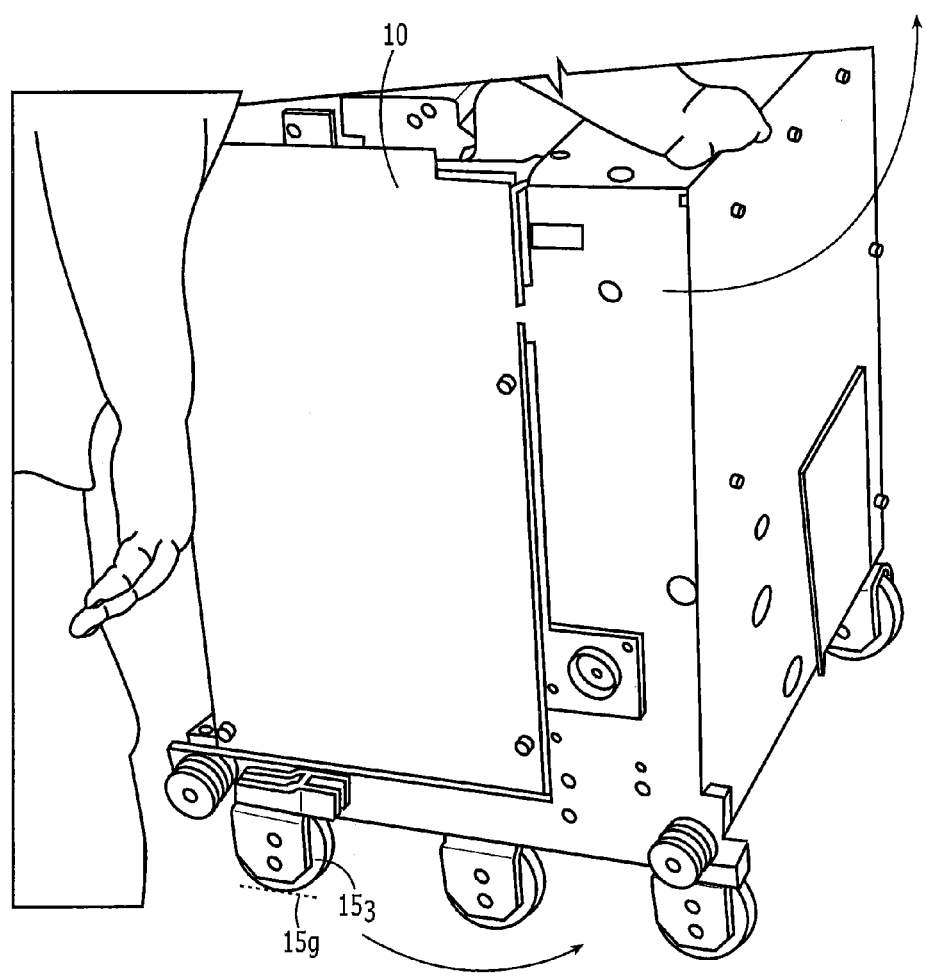
Figure 5C:
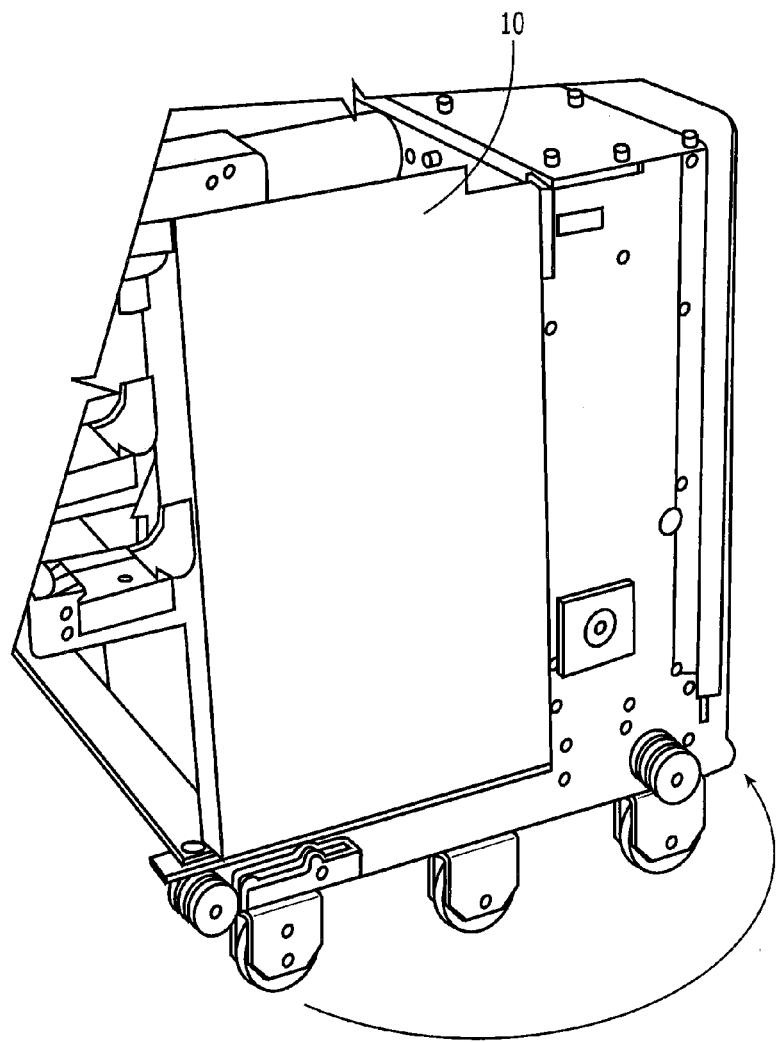
Figure 5D:
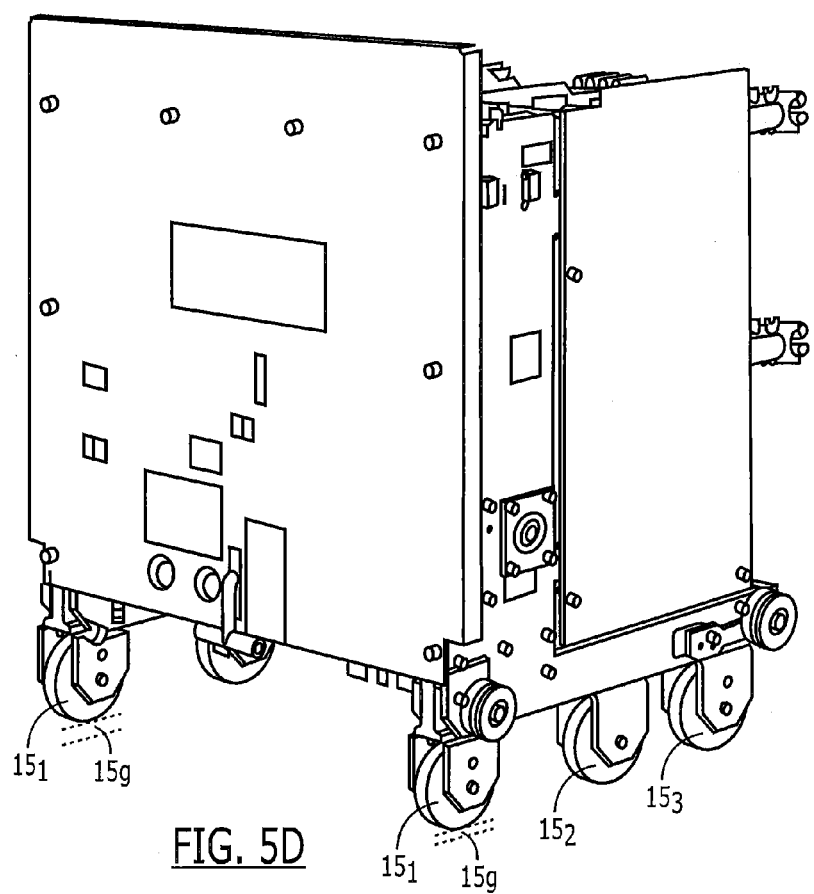

FIGS. 5A-5D illustrate a series of movement of a respective ROF breaker 10 which is easily pushed by a person, FIG. 5A illustrates the wheel $15_1$ off the ground $15g$ during movement on relatively flat terrain. FIGS. 5B and 5C illustrate a one (corner) touch rotation of the unit 10 as a low force or pressure against one corner can cause the unit to rotate in position at almost a zero clearance of radius of rotation and the wheel $15_3$ is of the ground $15g$ (FIG. 5) as it is the wheel away from the person's contact point. FIG. 5D illustrates the unit 10 pushed over a ledge with both end wheels $15_1$ off the ground.

Referring again to FIGS. 2-4B, the center wheel $15_2$ can have a visually different appearance than the end wheels $15_1$, $15_3$ to promote proper assembly. Either the center wheel $15_2$ or the end wheels can have visual indicia 30 to distinguish the different height $H_1$, $H_2$. As shown, the end wheels $15_1$, $15_3$ include the visual indicia 30 which is shown, by way of example, as an extra externally visible hole. However, the indicia 30 may be on the center wheel instead or both the center and end wheels can each have visual indicia. Other examples of visual indicia 30 that may be used include a label, color, or different shaped mounting bracket or segment thereof, e.g., a different profile or perimeter shaped wall 23. In addition or alternatively, the wheel $15_2$ itself or axle 16 can comprise visual indicia such as color, embossment, or a different shape.

Figure 6A:
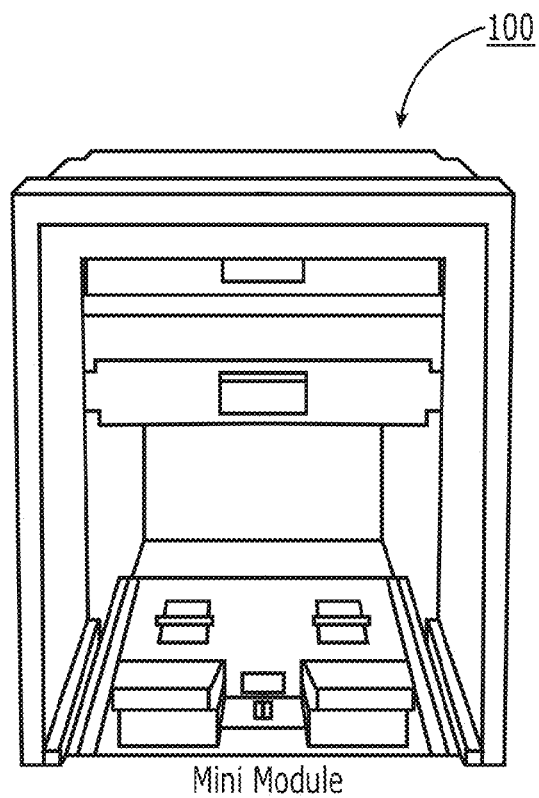
FIG. 6A is a front view of an ROF breaker parked or racked in position in a cell or mini module according to embodiments of the present invention.
Figure 6B:
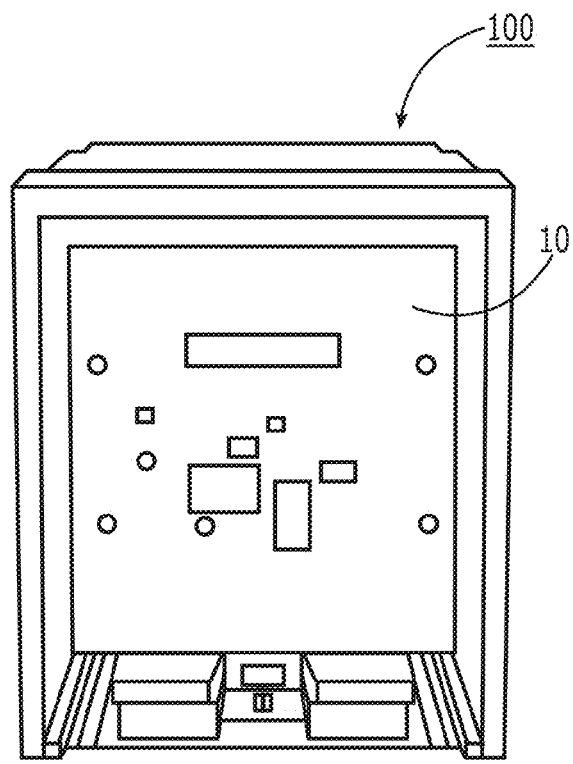
FIG. 6B is a front view of the cell or mini module without the ROF breaker.

FIG. 6A illustrates a front view of a mini-module 100 (also called a "cell") which is sized to receive the ROF breaker 10. FIG. 6B illustrates the ROF breaker 10 in position ("racked" in position) in the mini-module 100 for operation as is well known to those of skill in the art. The ROF breaker can be configured to travel into the mini-module via ramp or may directly roll in for engaging operational components.

Figure 7:
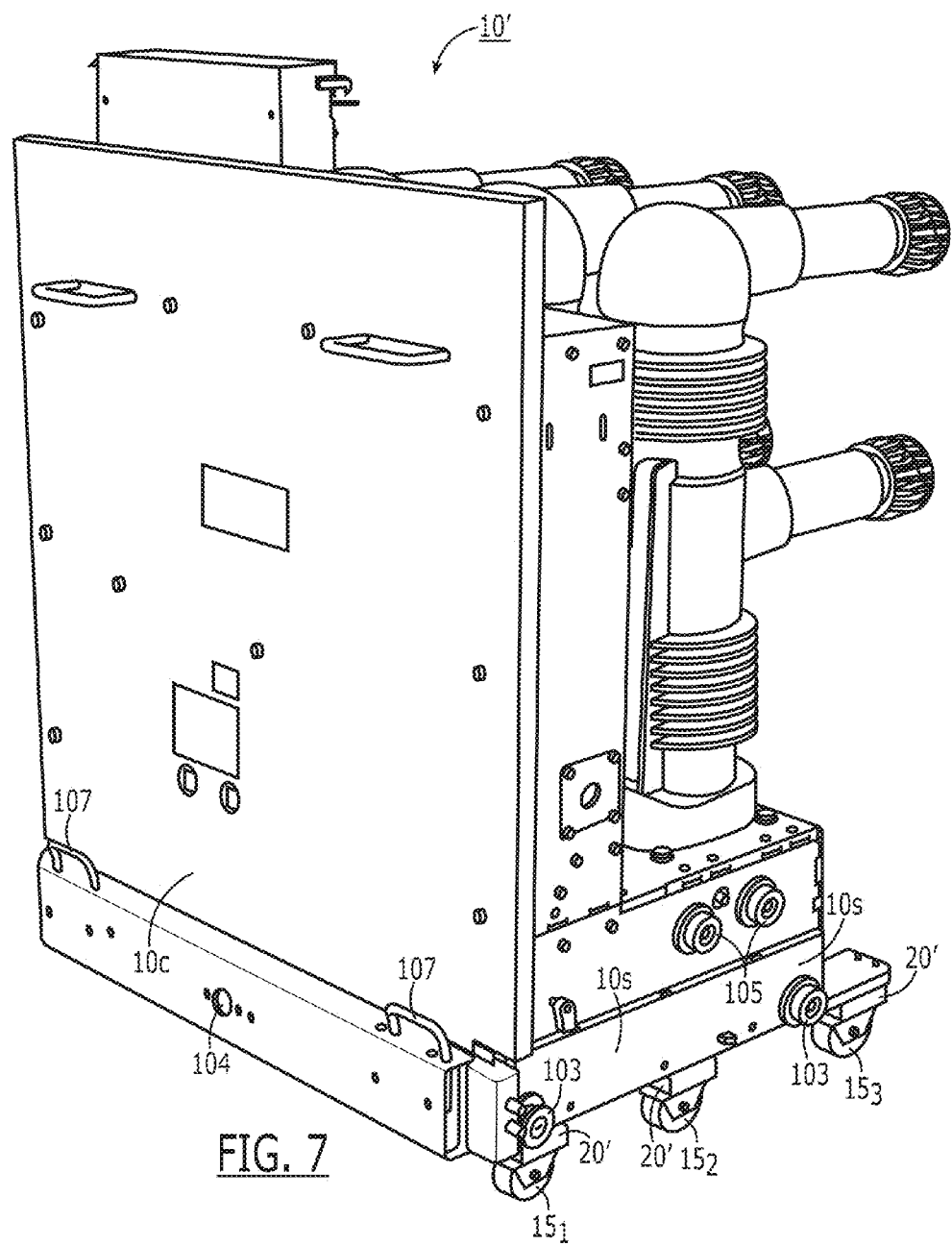
FIG. 7 is a side perspective view of an alternate embodiment of an ROF breaker according to embodiments of the present invention.

FIG. 7 illustrates a different embodiment of the ROF breaker 10'. The wheels $15_1$, $15_2$, $15_3$ can be configured as described above so that the wheel $15_2$ between the end wheels $15_1$, $15_3$ has its axis of rotation positioned a bit lower than the axis of rotation of one or both of the end wheels $15_1$, $15_3$. This unit can be a heavy model, e.g., about 1000-1500 lbs, typically about 1200 pounds. This ROF breaker 10' can be a medium voltage vacuum circuit breaker. The ROF breaker 10' can include wheels 15 with the rocker design described above with respect to FIGS. 2-5D, for example. The ROF breaker 10' can include an alternate configuration(s) of the mounting members 20' (no retrofit concerns constraining the design). The wheels 15 can be metal wheels that are non-swiveling.

The ROF breaker 10' can be a 38 kV drawout vacuum breaker.

The ROF circuit breaker 10' can include alignment rollers 103, shoot bolt pins 106, shoot bolt handles 107, a levering point 104, and shutter driver wheels 105.

The wheel $15_3$ can reside a distance out from the frame $10f$ (while the embodiments shown in FIGS. 2 and 3, this wheel resides under the frame $10f$ with the wheel $10w$ in front thereof).

Figure 8A:
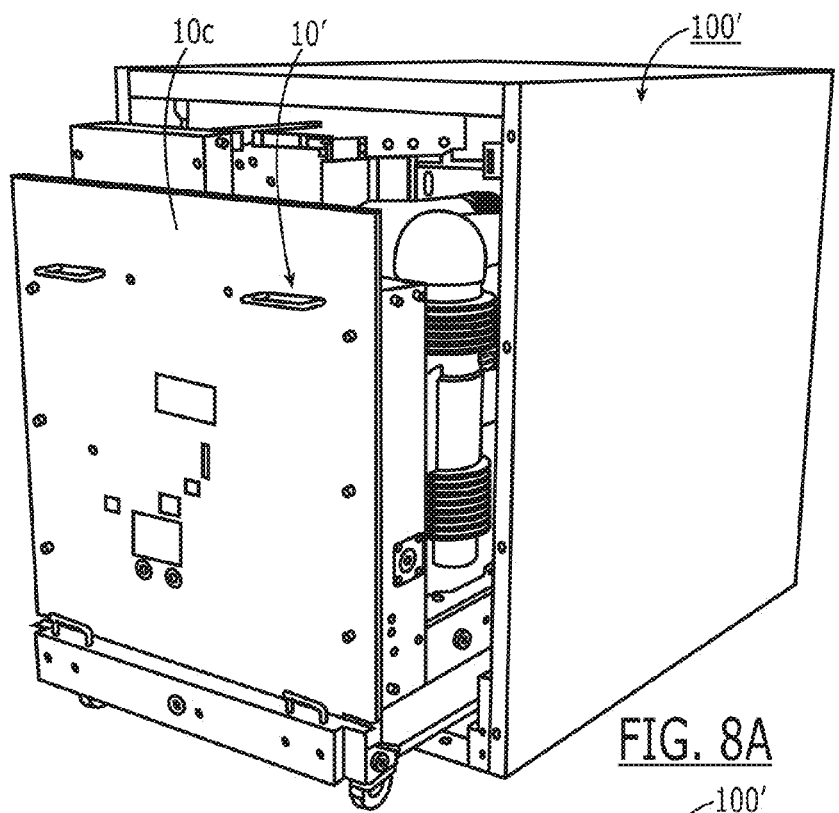
FIG. 8A is a side perspective view of the breaker shown in FIG. 9 aligned for a racked operative position in a cell or mini module according to embodiments of the present invention.
Figure 8B:
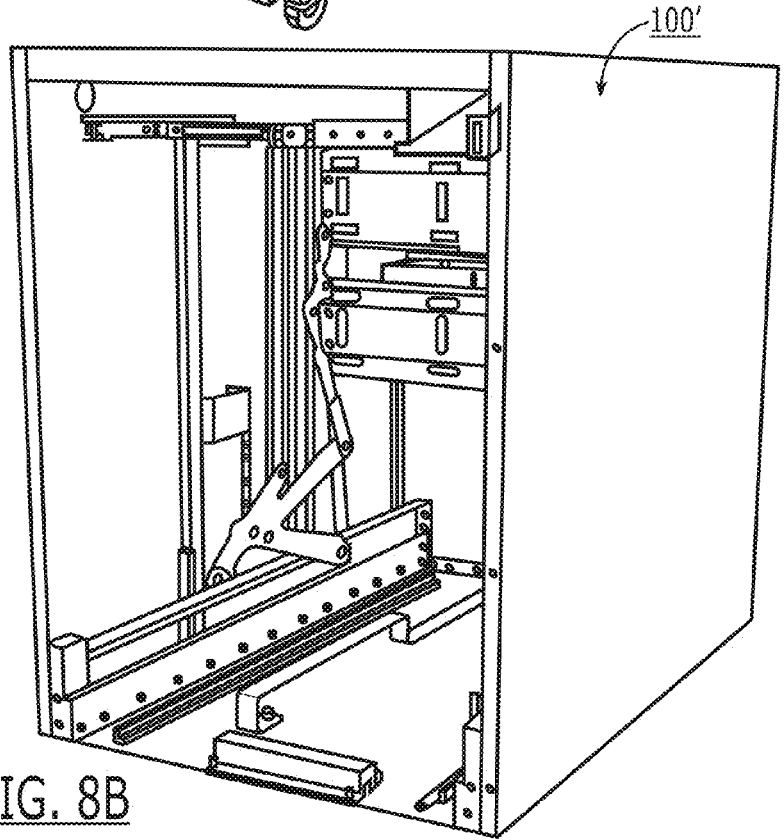
FIG. 8B is a side perspective view of the cell or mini module shown in FIG. 8A.

FIG. 8A illustrates the ROF breaker 10' sliding into the receiving mini-module 100'. FIG. 8B illustrates the mini-module 100' with its open interior and cooperating racks and operating components as are well known to those of skill in the art.

Figure 9:
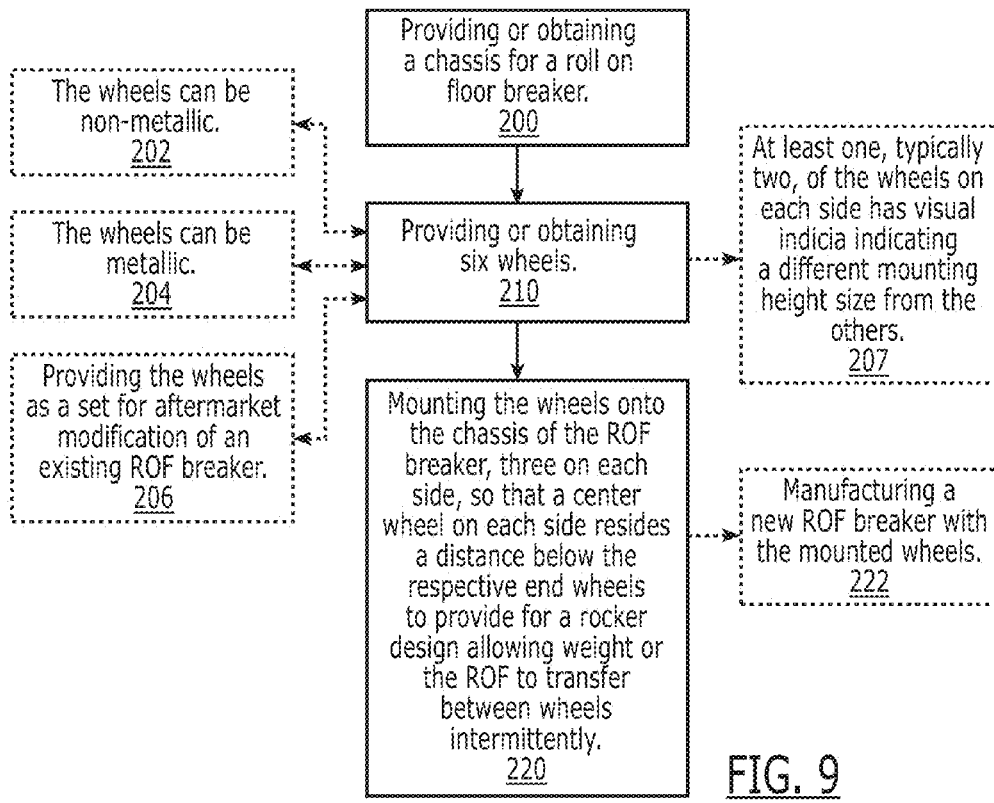
FIG. 9 is a flow chart of a method of modifying or making an ROF breaker according to embodiments of the present invention.

FIG. 9 is a flow chart of exemplary steps that can be used to fabricate, assemble and/or retrofit a ROF breaker 10 according to some embodiments of the present invention. A chassis for a roll on floor breaker is provided or obtained (block 200). Six wheels are provided or obtained (block 210). The wheels are mounted onto the chassis of the ROF breaker, three on each side, so that a center wheel on each side resides a distance below respective end wheels to provide for a rocker design whereby weight of the ROF breaker can be rocked and/or transferred between wheels (block 220).

The wheels can be non-metallic (block 202). The wheels can be metallic (block 204).

The wheels can be provided as a set for aftermarket modification of an existing ROF breaker (block 206). The wheels can be preassembled to mounting brackets as wheel assemblies or the mounting brackets and wheels can be provided partially or totally unassembled.

At least one of the three wheels for each side of the ROF breaker, typically two of the wheels, have visual indicia indicating a different operating height from the others (block 207).

A new ROF breaker can be manufactured or assembled with the mounted wheels (block 222).

Figure 10:
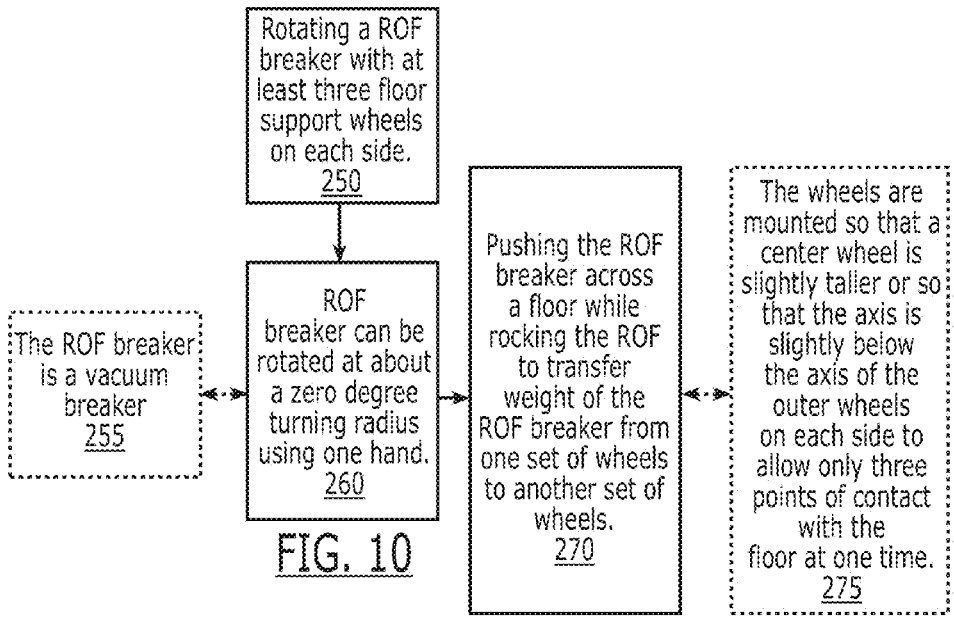
FIG. 10 is a flow chart of a method of moving an ROF breaker according to embodiments of the present invention.

FIG. 10 is a flow chart of a method of translating an ROF breaker having at least three floor support wheels on each side (block 250). Rotating the ROF breaker using one hand and a low force (block 260). Pushing the ROF breaker across a floor while the ROF is able to rock (side to side and/or front to back) to transfer weight of the ROF breaker from one set of wheels to another set of wheels (block 270).

The ROF breaker can be a vacuum breaker (block 255).

The wheels on each side are mounted so that a center wheel is at a position that makes it extend below the others (e.g., it is slightly taller than end wheels and/or its axis of rotation is below that of the other end wheels) on each side to allow only three points of contact with the floor at one time (block 275).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A roll on floor (ROF) circuit breaker assembly, comprising:
   a ROF circuit breaker; and
   a plurality of support wheels attached to the ROF circuit breaker, the support wheels configured to contact a support surface as the ROF circuit breaker is moved between locations, wherein the support wheels have a rocker configuration whereby weight of the ROF circuit breaker is transferred between different sets of the wheels during movement on a flat surface to thereby facilitate ease of movement, wherein the support wheels are non-swivel wheels, wherein the walls extend down to terminate proximate a lower end of the wheels at a location that is between 0.1 inches and 0.5 inches above the support surface, and wherein the ROF circuit breaker with the support wheels is configured to allow a user to push on one upper corner portion with one hand using a low force of between 1-10 pounds to cause the circuit breaker to rotate in a zero or small radius of curvature while rocking the wheels so that not all the support wheels contact the ground at any one time.

2. The ROF circuit breaker assembly of claim 1, wherein the plurality of support wheels include, on each side, a first end wheel and a second end wheel, the first and second end wheels positioned adjacent respective opposing ends of the side of the ROF circuit breaker, and a third wheel positioned between the first and second end wheels, wherein the third wheel has an axis of rotation that is below that of the first and second end wheels or has a larger diameter than the first and second end wheels.

3. The ROF circuit breaker assembly of claim 1, wherein the plurality of support wheels are six support wheels, three on each side of the ROF circuit breaker.

4. The ROF circuit breaker assembly of claim 1, wherein the support wheels reside under metal wheels or rollers and are about 3 inches in diameter.

5. The ROF circuit breaker assembly of claim 1, wherein the support wheels reside under metal wheels or rollers and are about 3 inches in diameter, wherein the plurality of support wheels are six support wheels, three on each side of the ROF circuit breaker, including a first end support wheel and a second end support wheel, the first and second end support wheels positioned adjacent respective opposing ends of a respective side of the ROF circuit breaker, and a third support wheel positioned between the first and second end support wheels, and wherein the support wheels are held in respective mounting brackets, and wherein the mounting brackets each include an upper segment that attaches to the ROF circuit breaker and a lower segment with downwardly extending spaced apart walls that hold a respective support wheel therebetween, wherein the walls include an axle aperture that holds an axle that extends through the wheel held therebetween.

6. The ROF circuit breaker assembly of claim 5, wherein the support wheels have a common outer diameter size, wherein the mounting bracket holding the third wheel has the axle apertures in the walls residing a distance below the axle apertures in the walls of the mounting brackets holding the respective end wheels, and wherein the distance is between about 0.01 inches to about 0.10 inches.

7. The ROF circuit breaker assembly of claim 6, wherein the distance is between about 0.04 inches and about 0.07 inches, and wherein the ROF circuit breaker is a draw out vacuum circuit breaker.

8. The ROF circuit breaker assembly of claim 6, wherein the distance is about 0.06 inches, and wherein the wheels are about 3 inches in outer diameter.

9. The ROF circuit breaker assembly of claim 5, wherein the upper segments of the mounting brackets have a common shape, and wherein the upper segments include a tall segment and a short segment separated by a downwardly extending slot, with at least one downwardly extending channel in the tall and short segments that receive attachment members that attach to a frame of the circuit breaker.

10. The ROF circuit breaker assembly of claim 1, wherein the wheels are held in or by brackets that attach to a frame of the circuit breaker, and wherein at least one of the brackets on each side of the ROF circuit breaker has visual indicia that makes the bracket visually distinguishable as different from the other brackets.

11. The ROF circuit breaker assembly of claim 5, wherein the walls extend down to end proximate a lower end of a respective wheel.

12. The ROF circuit breaker assembly of claim 1, wherein the support wheels are configured to allow a low force, one hand rotation of the ROF circuit breaker, and wherein the ROF circuit breaker weighs between about 250 pounds and about 1200 pounds.

13. A retrofit kit for a roll on floor (ROF) circuit breaker, comprising:
   a set of support wheels for each side of a respective existing ROF circuit breaker; and
   a set of mounting brackets attached to or configured to attach to respective support wheels, wherein the support wheels are configured to reside under metal wheels on an existing ROF circuit breaker and have a larger outer diameter than the metal wheels, and wherein the support wheels and mounting brackets are configured to attach to the existing ROF circuit breaker and provide a rocker configuration whereby weight of the ROF circuit breaker is transferred between different sets of the wheels during movement on a flat surface to thereby facilitate ease of movement, wherein the support wheels are non-swivel wheels, and wherein two of the brackets have visual indicia that makes those brackets visually distinguishable as different from the other brackets.

14. The kit of claim 13, wherein, when in position on the ROF circuit breaker, the ROF circuit breaker with the support wheels is configured to allow a user to push on one upper corner portion with one hand using a low force of between 1-10 pounds to cause the circuit breaker to rotate in a zero or small radius of curvature while rocking the wheels so that not all the support wheels contact the ground at any one time.

15. The kit of claim 13, wherein the set of support wheels is at least six support wheels, three for each side of the ROF circuit breaker, including a first end support wheel and a second end support wheel, the first and second end support wheels positioned adjacent respective opposing ends of a respective side of the ROF circuit breaker, and a third support wheel positioned between the first and second end support wheels and extending a distance below the first and second end support wheels, wherein the mounting brackets each include an upper segment that attach to the ROF circuit breaker and a lower segment with downwardly extending spaced apart walls that hold a respective support wheel therebetween, and wherein the walls include an axle aperture that holds an axle that extends through the wheel held therebetween, and wherein the walls extend down to terminate proximate a lower end of the wheels at a location that is between 0.1 inches and 0.5 inches above the support surface.

16. The kit of claim 15, wherein the support wheels have a common outer diameter size and are phenolic, wherein the mounting bracket holding the third wheel has the axle apertures in the walls residing a distance below the axle apertures in the walls of the mounting brackets holding the respective end wheels, and wherein the distance is between about 0.04 inches and about 0.07 inches.

17. The kit of claim 15, wherein the upper segments of the mounting brackets have a common shape, and wherein the upper segments include a tall segment and a short segment separated by a downwardly extending slot, with at least one downwardly extending channel in the tall and short segments that receive attachment members that attach to a frame of the circuit breaker.

18. The kit of claim 13, wherein the visual indicia of the two brackets is the same and comprises an aperture extending through an outerwall thereof.

19. A method of moving a roll on floor (ROF) circuit breaker from one location to another over a support surface, comprising:
  pushing the ROF circuit breaker causing the ROF to rock and transfer weight between different sets of at least six floor support wheels intermittently; and
  rotating the circuit breaker by pushing on one upper corner portion with one hand using a low force of between 1-10 pounds to cause the circuit breaker to rotate in a zero or small radius of curvature while rocking the wheels so that not all the support wheels contact the ground at any one time.

20. The ROF circuit breaker assembly of claim 10, wherein the at least one of the brackets on each side of the ROF circuit breaker that has the visual indicia that makes the bracket visually distinguishable as different from the other brackets comprises an aperture extending through an outerwall thereof above an aperture for holding the wheel axle.

* * * * *

UNITED STATES PATENT AND TRADEMARK OFFICE
CERTIFICATE OF CORRECTION

PATENT NO. : 9,270,092 B2
APPLICATION NO. : 14/055179
DATED : February 23, 2016
INVENTOR(S) : Benke et al.

Page 1 of 1

It is certified that error appears in the above-identified patent and that said Letters Patent is hereby corrected as shown below:

In the Specification

Column 5, Line 55: Please correct "$15_{19}$" to read -- $15_1$, --

Signed and Sealed this
Sixteenth Day of August, 2016

Michelle K. Lee
*Director of the United States Patent and Trademark Office*